United States Patent
Dokonal et al.

(10) Patent No.: US 8,539,665 B2
(45) Date of Patent: Sep. 24, 2013

(54) METHOD OF MANUFACTURING A ROTOR FOR AN ELECTRIC MOTOR FOR A WASHING MACHINE

(75) Inventors: Luiz V. Dokonal, Joinville (BR); Claudio W. Lima, Joinville (BR); Orlando Starke, Joinville (BR); Rodrigo S. Teixeira, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 13/281,801

(22) Filed: Oct. 26, 2011

(65) Prior Publication Data

US 2013/0104385 A1     May 2, 2013

(51) Int. Cl.
*H02K 15/02*     (2006.01)

(52) U.S. Cl.
USPC .................. 29/598; 29/596; 29/609; 310/184

(58) Field of Classification Search
USPC ........... 29/428–443, 729–732, 736, 596–598; 68/140, 12.26, 58, 133; 310/156.06, 179, 310/184, 254, 266
See application file for complete search history.

(56) References Cited

U.S. PATENT DOCUMENTS

| | | | |
|---|---|---|---|
| 4,102,040 A * | 7/1978 | Rich | 29/598 |
| 4,688,324 A | 8/1987 | Morrill | |
| 4,982,125 A | 1/1991 | Shirakawa | |
| 6,088,905 A * | 7/2000 | Boyd et al. | 29/598 |
| 6,223,416 B1 * | 5/2001 | Boyd et al. | 29/596 |
| 6,396,177 B1 | 5/2002 | Shin et al. | |
| 6,510,716 B1 | 1/2003 | Kim et al. | |
| 6,657,328 B2 | 12/2003 | Shiga et al. | |
| 6,707,185 B2 | 3/2004 | Hemmi et al. | |
| 6,765,326 B1 | 7/2004 | Nakazono et al. | |
| 7,380,424 B2 | 6/2008 | Kim et al. | |
| 7,397,158 B2 | 7/2008 | Lee et al. | |
| 7,557,486 B2 | 7/2009 | Choi et al. | |
| 7,652,406 B2 | 1/2010 | Kim et al. | |
| 7,677,063 B2 | 3/2010 | Jeon et al. | |
| 7,741,745 B2 | 6/2010 | Takekawa | |
| 7,800,265 B2 | 9/2010 | Nishikawa et al. | |
| 2007/0046123 A1 | 3/2007 | Marioni | |
| 2010/0307202 A1 * | 12/2010 | Maentele et al. | 68/140 |

* cited by examiner

*Primary Examiner* — Minh Trinh
(74) *Attorney, Agent, or Firm* — Clifton G. Green

(57) ABSTRACT

A method of manufacturing a rotor for an electric motor that includes producing a generally flat metal strip, bending one section of the strip relative to another section, and rolling the strip to form a cup-shaped shell.

13 Claims, 5 Drawing Sheets

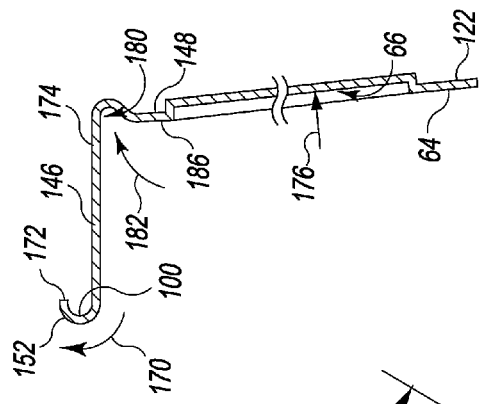
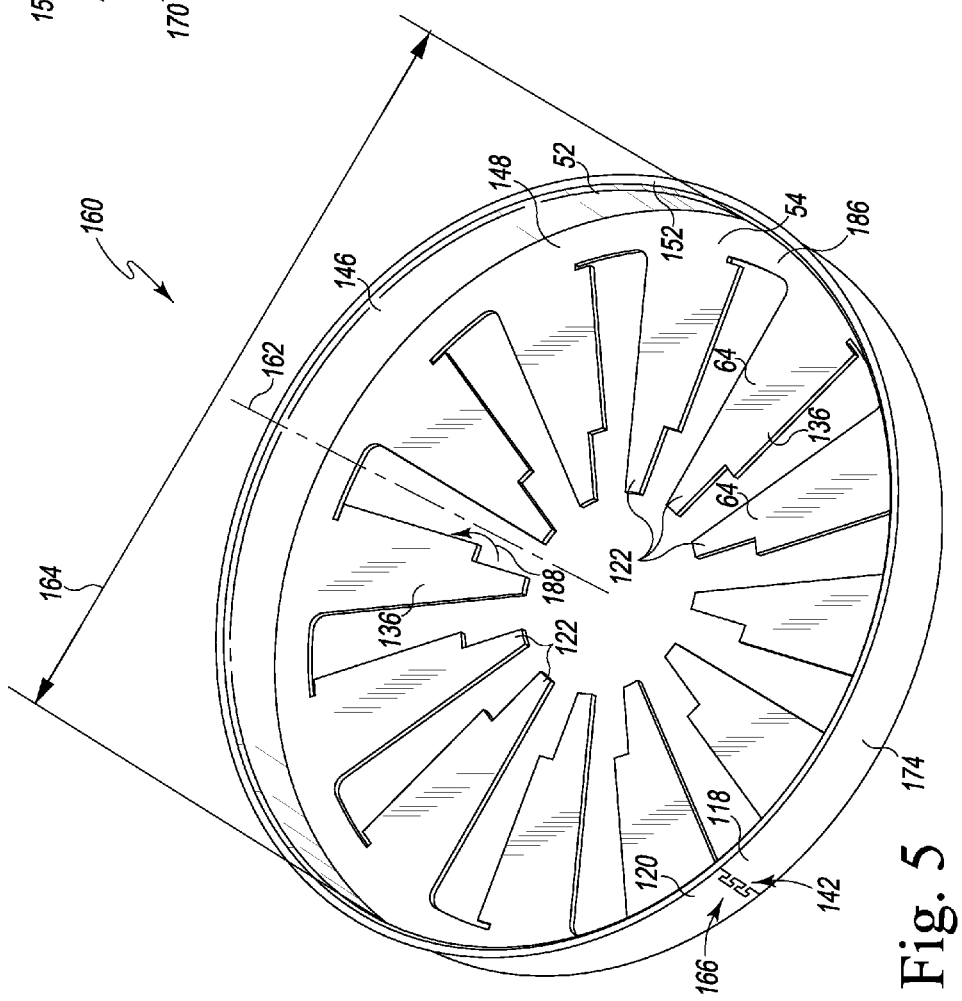

METHOD OF MANUFACTURING A ROTOR FOR AN ELECTRIC MOTOR FOR A WASHING MACHINE

TECHNICAL FIELD

The present disclosure relates generally to an electric motor for a washing machine, and, more particularly, to a method of manufacturing a rotor for an electric motor for a washing machine.

BACKGROUND

A washing machine is a domestic appliance for cleaning clothes, linens, and other laundry. A washing machine may include a tub and a drum positioned in the tub that is sized to receive laundry for cleaning. The washing machine may include an electric motor that causes the drum to rotate relative to the tub during a washing operation. In some washing machines, the electric motor may be connected to the drum via a transmission system including, for example, belts and pulleys. The electric motor may also be connected to the drum via a drive shaft. Washing machines including the latter type of electric motor are often referred to as "direct drive" washing machines.

Electric motors typically include a stator and a rotor configured to rotate relative to the stator. The stator may be fixed to the tub of the washing machine and may include a number of stator coils. The rotor may include one or more magnets that interact with the stator coils. During operation, the stator coils may be sequentially energized with electricity to cause the rotor to rotate. In a direct drive washing machine, the rotor may be torsionally secured to the drive shaft so that drive force may be transferred to the drum via the drive shaft.

SUMMARY

According to one aspect of the disclosure, a method of manufacturing a rotor for an electric motor is disclosed. The method includes producing a generally flat metal strip including a plate having a first longitudinal end and a second longitudinal end, and a plurality of protrusions extending from the plate between the first longitudinal end and the second longitudinal end. The method also includes bending a first section of the plate relative to a second section of the plate along an imaginary line extending between the first longitudinal end and the second longitudinal end. The second section of the plate has the plurality of protrusions extending therefrom. The method includes rolling the plate about an imaginary axis to form a cup-shaped body that has the plurality of protrusions extending radially inward and joining the first longitudinal end of the plate with the second longitudinal end of the plate. The method also includes attaching a hub that is configured to receive a drive shaft of the electric motor to the plurality of protrusions.

In some embodiments, each protrusion may include a body having a base attached to the second section of the plate and a tip spaced apart from the base. Attaching the hub to the plurality of protrusions may include securing the hub to the tip of each protrusion.

In some embodiments, the method may also include bending a flange extending from the body of a first protrusion to form a cooling fin between the base and the tip of the first protrusion. In some embodiments, the method may also include embossing the first protrusion to form a groove in a first surface of the first protrusion. Additionally, in some embodiments, the method may include forming a mounting hole through the tip of each protrusion. Attaching the hub to the plurality of protrusions may include passing a fastener through the mounting hole of each protrusion to secure the hub to the plurality of protrusions.

In some embodiments, attaching the hub to the plurality of protrusions may include molding a connecting flange of the hub to the tips of the plurality of protrusions. The connecting flange may be formed from a polymeric material.

Additionally, in some embodiments, joining the first longitudinal end of the plate with the second longitudinal end of the plate may include welding the first longitudinal end and the second longitudinal end. In some embodiments, joining the first longitudinal end of the plate with the second longitudinal end of the plate may include positioning a tab, which extends from the first longitudinal end, in a notch defined in the second longitudinal end.

In some embodiments, producing the generally flat metal strip may include producing a generally flat metal sheet having a first length. The generally flat metal sheet may include the generally flat metal strip having a second length less than the first length, and a second generally flat metal strip having a third length less than the first length. The second generally flat metal strip may include a second plate having a first longitudinal end and a second longitudinal end, and a second plurality of protrusions extending from the second plate.

In some embodiments, the method may also include attaching a plurality of magnets to a first surface of the first section of the plate facing the imaginary axis. Additionally, in some embodiments, the method may include bending a third section of the plate relative to the second section of the plate along a second imaginary line extending between the first longitudinal end of the plate and the second longitudinal end of the plate prior to rolling the plate about the imaginary axis.

In some embodiments, the method may include forming an annular rib from the third section of the plate after rolling the plate about the imaginary axis. Additionally, in some embodiments, the method may further include forming an annular groove in a first surface of the second section of the plate.

According to another aspect, a method of manufacturing a rotor for an electric motor includes producing a generally flat metal strip including a plate having a first longitudinal end and a second longitudinal end, and a plurality of protrusions extending from the plate. The method also includes bending a first section of the plate relative to a second section of the plate along a first imaginary line extending between the first longitudinal end and the second longitudinal end. The second section of the plate has the plurality of protrusions extending therefrom in a first direction. The method includes bending a third section of the plate relative to the first section along a second imaginary line extending between the first longitudinal end and the second longitudinal end such that the third section extends in a second direction opposite the first direction. The method further includes rolling the plate about an imaginary axis such that the plurality of protrusions extend inwardly toward the imaginary axis, joining the first longitudinal end of the plate with the second longitudinal end of the plate, and attaching a hub to the plurality of protrusions. The hub is configured to receive a drive shaft of the electric motor.

In some embodiments, rolling the plate about the imaginary axis may include forming a cup-shaped shell that includes the first section of the plate defining a substantially cylindrical outer wall of the shell and the second section of the plate defining a side wall of the shell.

In some embodiments, the method may include forming an annular groove in a first surface of the side wall of the plate. In some embodiments, the method may include forming a mounting hole through each protrusion of the plurality of protrusions. Attaching the hub to the plurality of protrusions may include passing a fastener through the mounting hole of each protrusion to secure the hub to the plurality of protrusions.

In some embodiments, attaching the hub to the plurality of protrusions may include molding a connecting flange of the hub to the plurality of protrusions. In some embodiments, the method may also include bending a first section of a first protrusion of the plurality of protrusions relative to a second section of the first protrusion to form a cooling fin.

According to another aspect, a method of manufacturing a rotor for an electric motor includes producing a generally flat metal strip that includes a plate having a first longitudinal end and a second longitudinal end, and a plurality of protrusions extending from the plate. The method also includes forming a cup-shaped shell from the metal strip. The cup-shaped shell has the plurality of protrusions extending radially inward. The method further includes joining the first longitudinal end of the plate with the second longitudinal end of the plate, and attaching a hub to the plurality of protrusions. The hub is configured to receive a drive shaft of the electric motor.

BRIEF DESCRIPTION OF THE DRAWINGS

The detailed description particularly refers to the following figures, in which:

FIG. 5 is a front perspective view of a shell formed from the metal strip of FIGS. 3 and 4;

FIG. 6 is a partial cross-sectional side elevation view of the shell after being further processed according to the method of FIG. 2.

DETAILED DESCRIPTION OF THE DRAWINGS

Figure 1:
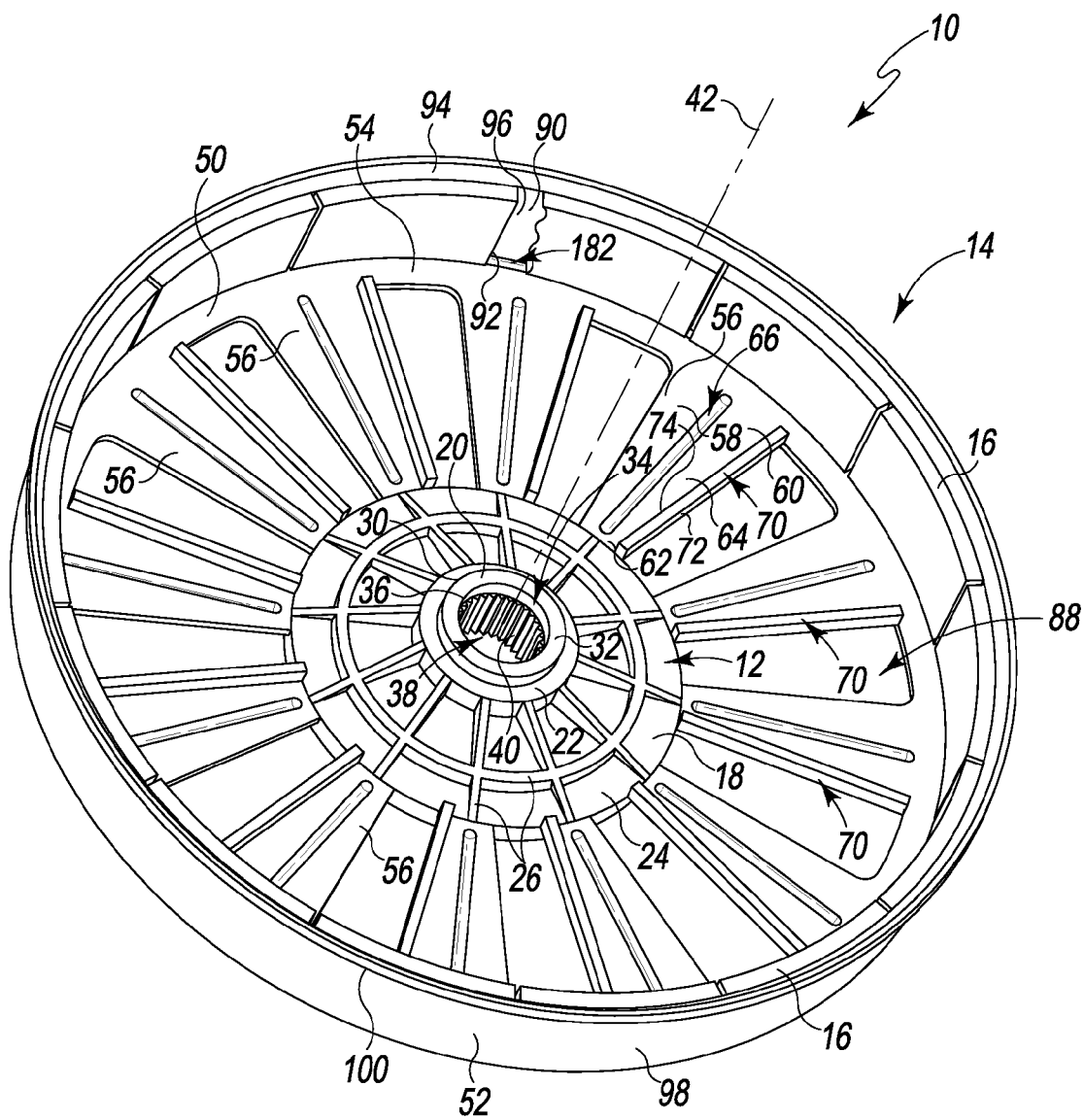
FIG. 1 is a front perspective view of one embodiment of a rotor for an electric motor.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring now to FIG. 1, one embodiment of a rotor 10 for an electric motor is shown. One example of an electric motor is shown and described in U.S. Patent App. Pub. No. 2010/0307202, entitled "WASHING MACHINE WITH A DIRECT DRIVE SYSTEM," which is incorporated herein by reference. The rotor 10 includes a hub 12 configured to be coupled to a drive shaft (not shown) of the electric motor and a frame 14 secured to the hub 12. A plurality of magnets 16 are secured to the frame 14.

The hub 12 of the rotor 10 includes a housing 18 that is secured to the frame 14 and a mounting collar 20 that is positioned in the housing 18. The housing 18 of the hub 12 includes a central platform 22 and a connecting flange 24 extending outwardly from the platform 22. A plurality of ribs 26 extend radially outward from the platform 22 to reinforce the structure of the housing 18. In the illustrative embodiment, the housing 18 is formed from a polymeric material, such as, for example, a plastic resin. In other embodiments, the housing 18 may also be formed from a metallic material, such as, for example, aluminum or an aluminum alloy.

As shown in FIG. 1, the housing 18 is molded over the mounting collar 20 via an injection molding process. In the illustrative embodiment, the mounting collar 20 is formed from a metallic material, such as, for example, steel. It should be appreciated that in other embodiments the housing 18 may be formed separately from the mounting collar 20 and later assembled with the mounting collar 20 to form the hub 12. Additionally, in other embodiments, the housing 18 and the collar 20 may be formed as a single monolithic component.

The mounting collar 20 of the hub 12 includes a shell 30 that extends outwardly from the platform 22 of the housing 18. The shell 30 includes an outer face 32 that has a circular opening 34 defined therein. An inner surface 36 extends inwardly from the opening 34 to define a cylindrical passageway 38 through the collar 20. The mounting collar 20 also includes a plurality of splines 40 that extend inwardly from the inner surface 36.

As shown in FIG. 1, the passageway 38 defines a longitudinal axis 42 extending through the hub 12. The rotor 10 is configured to rotate about the axis 42. When the rotor 10 is secured to the drive shaft, the splines 40 are configured to engage the drive shaft of the electric motor such that the rotor 10 may be torsionally secured to the drive shaft. In that way, rotation of the rotor 10 about the axis 42 causes rotation of the drive shaft of the motor.

As described above, the frame 14 of the rotor 10 is secured to the hub 12. The frame 14 includes a side wall 50 and an outer rim 52 extending from the side wall 50. In the illustrative embodiment, the frame 14 has a cup-shape that is defined by the wall 50 and the rim 52, and the frame 14 is formed as a single monolithic component from a metallic material, such as, for example, steel. It will be appreciated that in other embodiments the frame 14 may be formed from aluminum or other metallic alloy.

As shown in FIG. 1, the side wall 50 of the frame 14 includes an annular wall section 54 and a plurality of spokes 56 that extend radially inward from the annular wall section 54 toward the longitudinal axis 42. The annular wall section 54 has an annular groove 180 defined therein that is positioned adjacent to the intersection between the side wall 50 and the outer rim 52. Each spoke 56 has a body 58 including a base 60 that is connected to the annular wall section 54 and a tip 62 that is spaced radially inward from the base 60. The body 58 is tapered such that the body 58 is wider at the base 60 than at the tip 62. The connecting flange 24 of the hub 12 is secured to the tip 62 of each spoke 56, as described in greater detail below.

The body 58 of each spoke 56 has an inner surface 64, and a groove 66 is defined in the inner surface 64. As shown in FIG. 1, the groove 66 extends along the length of the body 58 between the base 60 and the tip 62. It should be appreciated that in other embodiments each spoke 56 may include additional grooves defined in different arrangements on the inner surface 64 of the spoke 56. Additionally, in other embodiments, the grooves may be omitted from one or more of the spokes 56.

The frame 14 of the rotor 10 further includes a plurality of cooling fins 70. Each cooling fin 70 includes a rectangular bar 72 that extends from a side wall 74 of the body 58 of each spoke 56. As shown in FIG. 1, the bar 72 is positioned between the base 60 and the tip 62 of each spoke 56. Each rectangular bar 72 includes an upper surface 86 that is offset from, and extends parallel to, the inner surface 64 of the body 58 of each spoke 56. When the rotor 10 is rotated about the longitudinal axis 42, the cooling fins 70 assist in drawing air through the slots 88 defined between the spokes 56. It should be appreciated that in other embodiments the cooling fin may have an arched shape, a triangular shape, trapezoidal shape, or any other suitable configuration. It should also be appreciated that in other embodiments the cooling fins may be omitted.

The rim 52 of the frame 14 includes an outer wall 90 extending from an end 92 attached to the side wall 50 to an end 94. The outer wall 90 has an inner surface 96 that faces the longitudinal axis 42 of the rotor 10, and an outer surface 98 positioned opposite the inner surface 96. In the illustrative embodiment, the inner surface 96 is substantially cylindrical. As shown in FIG. 1, the rim 52 has an annular rib 100 that extends outwardly from the outer surface 98 of the wall 90 at the end 94. It should be appreciated that in other embodiments the annular rib may be omitted from the frame 14.

As described above, the rotor 10 also includes a plurality of magnets 16. The magnets 16 are secured to the inner surface 96 of the outer wall 90 of the rim 52. In the illustrative embodiment, each magnet 16 is a permanent magnet that generates a constant magnetic field in the rotor 10. The magnets 16 may be formed from ferrite materials, alnico, or other metallic materials and may be produced by any known process, including, for example, sintering, molding, or extrusion. During operation, the magnets 16 interact with the coils of the stator (not shown) to cause the rotor 10 to rotate about the longitudinal axis 42.

Figure 2:
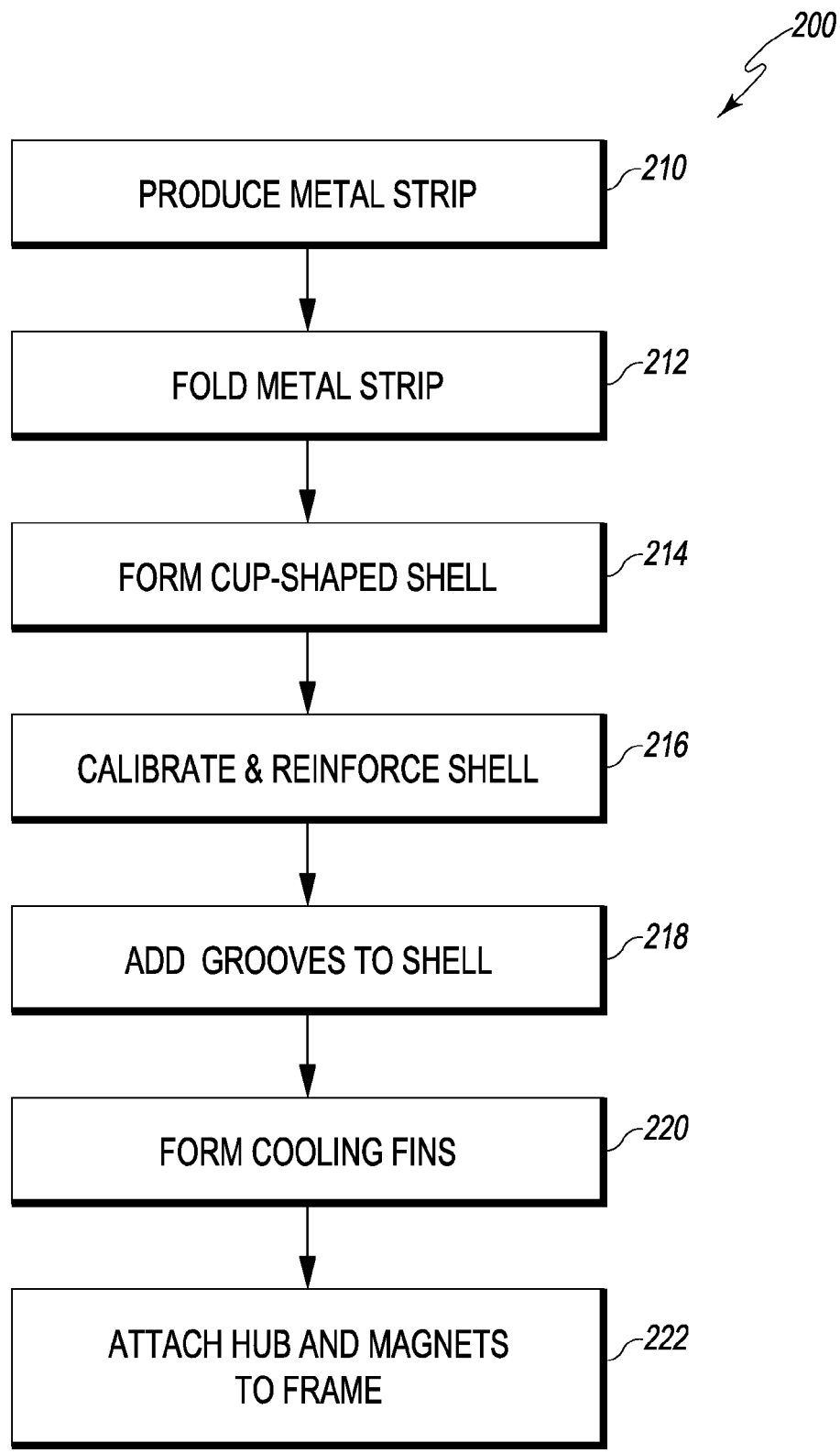
FIG. 2 is a flow chart of a method of manufacturing the rotor of FIG. 1.

Referring now FIG. 2, a method of manufacturing the rotor 10 is illustrated. As shown in FIGS. 3-7, the rotor 10 may be manufactured by producing a generally flat metal strip 112 and bending one section of the strip 112 relative to another section of the strip 112. The strip 112 may be further processed to fashion the frame 14 of the rotor 10. Thereafter, the hub 12 and the magnets 16 may be attached to the frame 14.

Figure 3:
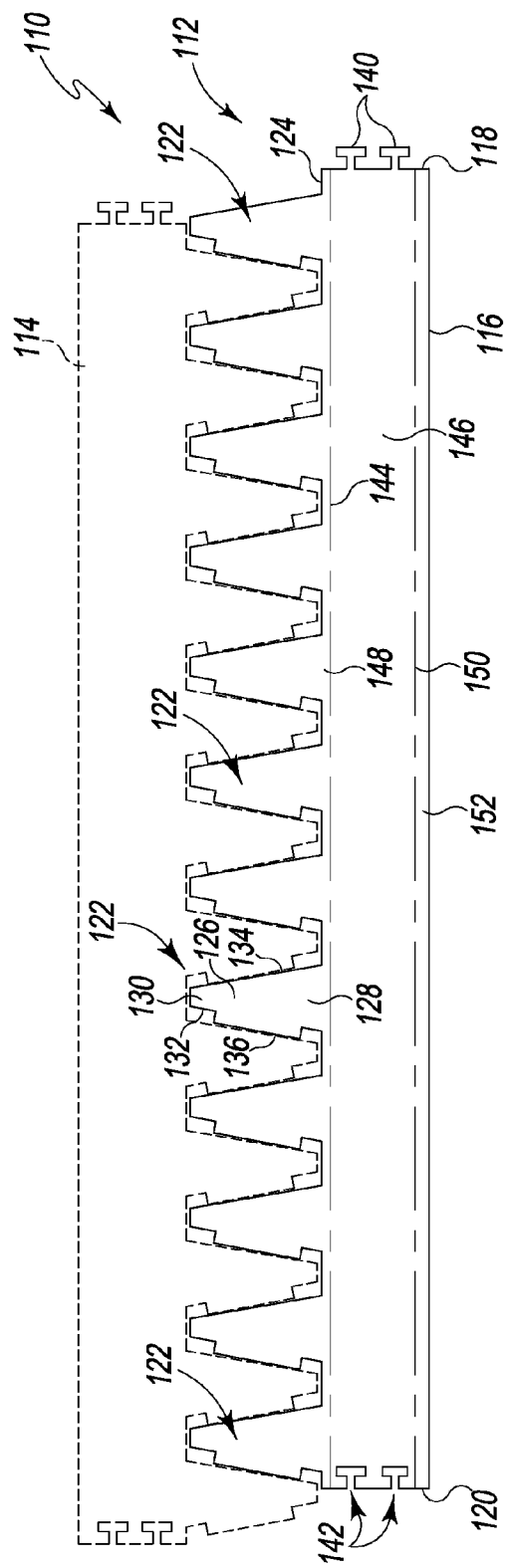
FIG. 3 is a top plan view of a metal strip produced according to the method of FIG. 2.

In block 210, the generally flat metal strip 112 may be produced via a progressive stamping process. To do so, a metal strip or sheet 110 is advanced through one or more stations of a progressive stamping die. As the sheet 110 is moved through the stations, the sheet 110 is cut into generally flat metal strips 112, 114. As shown in FIG. 3, the strip 114 is a mirror image of the strip 112. The sheet 110 has a substantially uniform thickness that may vary from approximately 1.0 millimeters to 5.0 millimeters. While the sheet 110 is illustratively shown as the same length as the strips 112, 114, it should be appreciated that the sheet 110 may be part of a larger roll of sheet metal that is advanced through the stamping die and cut into one or more pieces.

The strip 112 includes a rectangular plate 116 extending from a longitudinal end 118 to another longitudinal end 120. The strip 112 also includes a plurality of protrusions 122 that extend outwardly from a sidewall 124 of the plate 116. As described in greater detail below, each protrusion 122 corresponds to a spoke 56 of the frame 14. Each protrusion 122 has a body 126 that includes a base 128 attached to the sidewall 124 of the plate 116 and a tip 130 spaced apart from the base 128. The body 126 has a pair of tapered side walls 132, 134. The protrusion 122 also has a rectangular flange 136 that extends outwardly from the sidewall 132 of the body 126.

The plate 116 of the strip 112 includes a pair of tabs 140 that extend outwardly from the longitudinal end 118. A pair of notches 142 is defined in the opposite longitudinal end 120 of the plate 116. Each notch 142 of the longitudinal end 120 is sized to receive a corresponding tab 140 of the longitudinal end 118 such that the ends 118, 120 may be joined together, as described in greater detail below. It should be appreciated that in other embodiments the ends 118, 120 may include additional tabs and/or slots. It should also be appreciated that in other embodiments the tabs and slots may be omitted.

Figure 4:
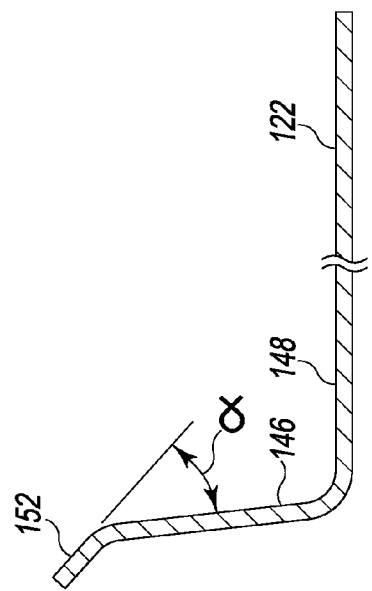
FIG. 4 is a cross-sectional side elevation view of the metal strip after being partially processed according to the method of FIG. 2.

After the sheet 110 is cut into the strips 112, 114, the method 200 advances to block 212 in which the strip 112 undergoes further processing. In block 212, the plate 116 is folded or bent along an imaginary line 144 extending between the longitudinal ends 118, 120. As shown in FIG. 3, the imaginary line 144 defines a plate section 146 and a plate section 148 of the plate 116, and the plurality of protrusions 122 extend outwardly from the plate section 148. When the plate 116 is folded, the plate section 146 is bent relative to the plate section 148, as shown in FIG. 4.

In block 212, the plate 116 is also folded or bent along another imaginary line 150 extending between the longitudinal ends 118, 120. As shown in FIG. 3, the line 150 is positioned on the opposite side of the plate 116 from the line 144, and the line 150 defines another plate section 152 of the plate 116. When the plate 116 is folded along the line 150, the plate section 152 extends from the plate section 146 in the direction opposite the plate section 148, as shown in FIG. 4. An angle α is defined between the plate sections 146, 152. In the illustrative embodiment, the angle α has a magnitude less than ninety degrees. It should be appreciated that the folding of the plate 116 along the lines 144, 150 may be completed in one operation or in multiple operations.

After folding the plate 116 in block 212, the method 200 may advance to block 214 in which the strip 112 is processed into a generally cylindrical shell 160. To do so, the plate 116 may be curled or rolled about an imaginary axis 162 such that the longitudinal end 118 is brought into contact with the opposite longitudinal end 120. As shown in FIG. 5, the tabs 140 of the longitudinal end 118 are positioned in the notches 142 of the longitudinal end 120. The ends 118, 120 are further joined by welding the strip 112 along the seam 166 defined between the ends 118, 120.

As shown in FIG. 5, the shape of the shell 160 corresponds to the cup-shape of the frame 14. The plate section 146 defines the outer rim 52 and an outer diameter of the shell 160. The plate section 148, which extends inwardly from the plate section 146, defines the annular wall section 54. The plurality of protrusions 122 extend radially inward from the plate section 148 toward the axis 162. As described above, each protrusion 122 corresponds to a spoke 56 of the frame 14. After rolling the plate 116 about the imaginary axis 162 and joining the ends 118, 120, the method 200 may advance to block 216.

In block 216, the shell 160 undergoes further processing to calibrate the diameter of the shell 160 and reinforce the shell 160. To calibrate the diameter, the inner diameter 164 of the shell 160 may be measured. If the diameter 164 is incorrect, the plate section 146 may be adjusted to increase or decrease the diameter 164. To do so, the diameter 164 of the shell 160 may be expanded by plastic deformation and measured again to determine if the shell 160 has the target final inner diameter.

Additionally, in block 216, the shell 160 is reinforced by bending the plate section 152 in the direction indicated by arrow 170 in FIG. 6. The plate section 152 is curled into a U-shape, thereby defining the annular rib 100. As shown in FIG. 6, an end 172 of the plate section 152 is positioned over the outer surface 174 of the plate section 146. It should be appreciated that in other embodiments the section 152 may extend perpendicularly from the section 146 or at an angle relative to the section 146.

Figure 7:
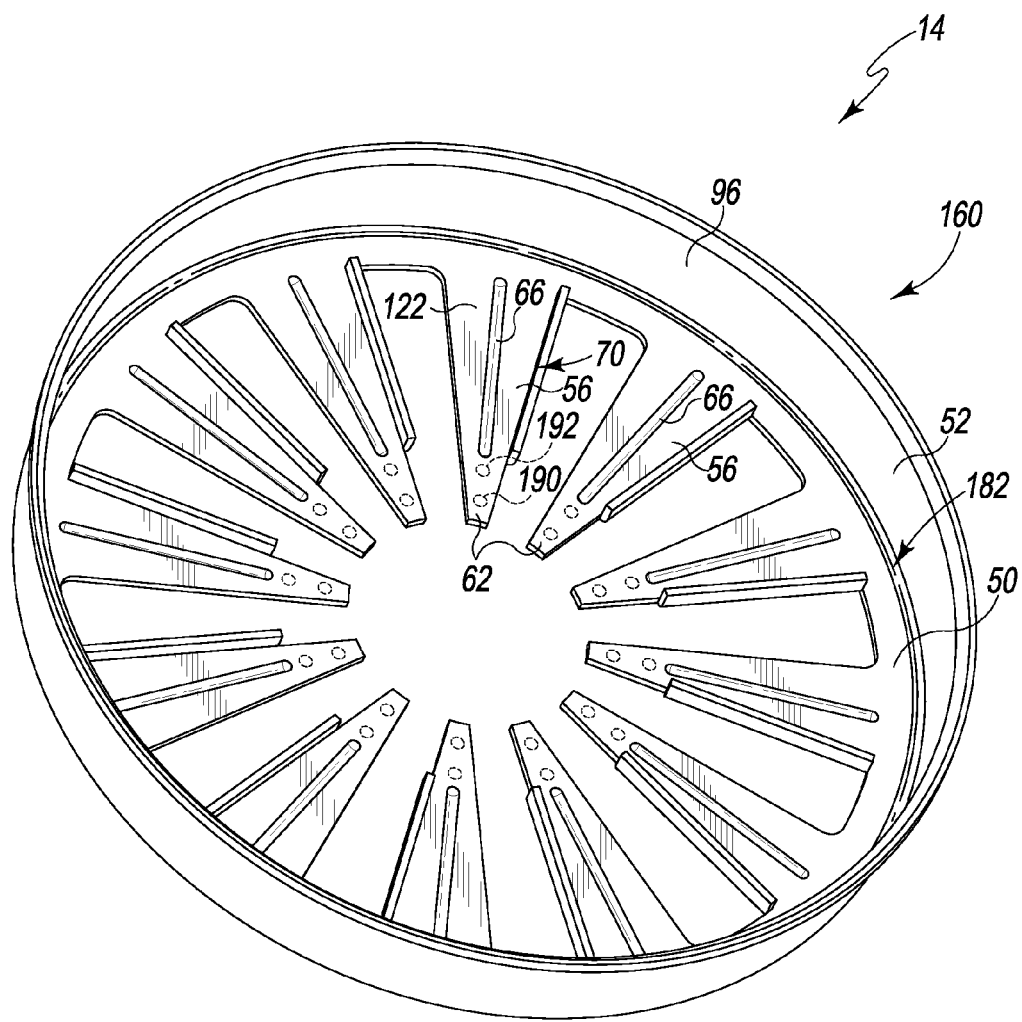
FIG. 7 is a front perspective view of one embodiment of a frame of the rotor of FIG. 1.

As shown in FIGS. 6 and 7, an annular groove 180 is defined in the plate section 148 in block 216. To form the groove 180, the plate section 148 is pressed in the direction indicated by arrow 182 to emboss the groove 180 into the inner surface 186 of the plate section 148. In this operation, any number of machines may be used to create the groove 180, including, for example, a pressure embossing machine having matched male and female dies.

The method 200 may then advance to block 218 in which grooves are added to the shell 160. As shown in FIG. 6, the surface 64 of each protrusion 122 (or spoke 56) is embossed to define a groove 66 in the surface 64. To do so, the protrusion 122 is pressed in the direction indicated by arrow 176. Any number of machines may be used to create the groove 66, including, for example, a pressure embossing machine having matched male and female dies. As described above, the groove 66 extends along the length of the protrusion 122.

After forming the grooves 66 in the shell 160, the method 200 may advance to block 220 in which the cooling fins 70 are formed in the shell 160. As described above, each protrusion 122 has a flange 136 that extends outwardly from the sidewall 132 of the body 126. As shown in FIG. 5, each flange 136 includes a side surface 184 that is co-planar with the surface 64 of the protrusion 122 (or spoke 56). To form a cooling fin 70, the flange 136 is bent relative to the body 126 of the protrusion 122, as indicated by arrow 188 in FIG. 5. When the flange 136 is in properly positioned as shown in FIG. 7, the side surface 184 of the flange 136 extends orthogonal to the surface 64 of the protrusion 122, and the flange 136 defines the cooling fin 70. The bending operation may be repeated for each protrusion 122 until each flange 136 is positioned as shown in FIG. 7. It should be appreciated that the blocks 216 through 220 may be performed in a single operation or may be separated into multiple operations.

As shown in FIG. 7, the shell 160 includes the features of the frame 14. The plate section 146 defines the outer rim 52 of the frame 14, and the plate section 148, which extends inwardly from the plate section 146, defines the annular wall section 54. The plurality of protrusions 122 extend radially inward from the plate section 148 and define the spokes 56 of the frame 14. It should be appreciated that in other embodiments one or more of the operations described in the method 200 may be altered or omitted. For example, where the frame does not include cooling fins, block 220 may be omitted. Similarly, for embodiments in which the frame includes additional grooves or reinforcing structure, additional operations may be added. Additionally, it should be appreciated that the order of the operations shown and described in reference to FIGS. 2-7 is intended to be exemplary and may be altered in other embodiments.

The method 200 may then advance to block 222 in which the hub 12 and the magnets 16 are attached to the frame 14. As described above, the magnets 16 are attached to the surface 96 of the rim 52 of the frame 14. To do so, an adhesive may be applied to the surface 96 and/or the back surface (not shown) of each magnet 16. As shown in FIG. 1, each magnet 16 is installed along the inner circumference of the rim 52. The magnets 16 are positioned end-to-end on the surface 96.

In block 222, the hub 12 is secured to the frame 14. As described above, the hub 12 includes a housing 18 and a mounting collar 20. In the illustrative embodiment, the housing 18 is molded over the mounting collar 20 and the tips 62 of the spokes 56 via an injection molding process. To do so, the collar 20 and the frame 14 may be placed in a mold. A polymeric or plastic material is injected into the mold and flows over the tips 62 of the spokes 56 and the mounting collar 20. When the material cools, the housing 18 is formed, thereby securing the mounting collar 20 to the frame 14.

It should be appreciated that in other embodiments the hub 12 may be secured to the frame 14 via a number of fasteners. To do so, the tip 62 of each spoke 56 may have a pair of through-holes 190, 192 defined therein, as shown in FIG. 7. The through-holes 190, 192 of the spokes 56 may be sized to receive fasteners, such as, for example, pins, tabs, or bolts that secure the hub 12 to the frame 14. It should be appreciated that the hub 12 may be secured to the frame 14 before or after the magnets 16 are attached to the frame 14.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A method of manufacturing a rotor for an electric motor, comprising:
producing a generally flat metal strip that includes (i) a plate having a first longitudinal end and a second longitudinal end, and (ii) a plurality of protrusions extending from the plate between the first longitudinal end and the second longitudinal end,
bending a first section of the plate relative to a second section of the plate along an imaginary line extending between the first longitudinal end and the second longitudinal end, the second section of the plate having the plurality of protrusions extending therefrom,
rolling the plate about an imaginary axis to form a cup-shaped body, the cup-shaped body including the plurality of protrusions extending radially inward,
joining the first longitudinal end of the plate with the second longitudinal end of the plate, and
attaching a hub to the plurality of protrusions, the hub being configured to receive a drive shaft of the electric motor.

2. The method of claim 1, wherein each protrusion includes a body having a base attached to the second section of the plate and a tip spaced apart from the base, and attaching the hub to the plurality of protrusions includes securing the hub to the tip of each protrusion.

3. The method of claim 2, further comprising forming a mounting hole through the tip of each protrusion, wherein attaching the hub to the plurality of protrusions includes passing a fastener through the mounting hole of each protrusion to secure the hub to the plurality of protrusions.

4. The method of claim 2, wherein attaching the hub to the plurality of protrusions includes molding a connecting flange of the hub to the tips of the plurality of protrusions, the connecting flange being formed from a polymeric material.

5. The method of claim 2, further comprising bending a flange extending from the body of a first protrusion to form a cooling fin between the base and the tip of the first protrusion.

6. The method of claim 5, further comprising embossing the first protrusion to form a groove in a first surface of the first protrusion.

7. The method of claim 1, wherein joining the first longitudinal end of the plate with the second longitudinal end of the plate includes welding the first longitudinal end and the second longitudinal end.

8. The method of claim 1, wherein joining the first longitudinal end of the plate with the second longitudinal end of the plate includes positioning a tab extending from the first longitudinal end in a notch defined in the second longitudinal end.

9. The method of claim 1, wherein producing the generally flat metal strip includes producing a generally flat metal sheet having a first length, the generally flat metal sheet comprising:
- the generally flat metal strip having a second length less than the first length, and
- a second generally flat metal strip having a third length less than the first length, the second generally flat metal strip including:
  - (i) a second plate having a first longitudinal end and a second longitudinal end, and
  - (ii) a second plurality of protrusions extending from the second plate.

10. The method of claim 1, further comprising attaching a plurality of magnets to a first surface of the first section of the plate, the first surface facing the imaginary axis.

11. The method of claim 1, further comprising bending a third section of the plate relative to the second section of the plate along a second imaginary line extending between the first longitudinal end of the plate and the second longitudinal end of the plate prior to rolling the plate about the imaginary axis.

12. The method of claim 11, further comprising forming an annular rib from the third section of the plate after rolling the plate about the imaginary axis.

13. The method of claim 1, further comprising forming an annular groove in a first surface of the second section of the plate.

* * * * *